United States Patent
Song et al.

(10) Patent No.: US 7,398,020 B2
(45) Date of Patent: Jul. 8, 2008

(54) MULTIPOINT GATING CONTROL BLOCK IN AN ETHERNET PASSIVE OPTICAL NETWORK AND METHOD THEREFOR

(75) Inventors: Jae-Yeon Song, Seongnam-si (KR); Jin-Hee Kim, Suwon-si (KR); A-Jung Kim, Seoul (KR); Se-Youn Lim, Seoul (KR); Min-Hyo Lee, Suwon-si (KR); Su-Hyung Kim, Seoul (KR)

(73) Assignee: Samsung Electronics Co., Ltd., Maetan-Dong, Yeongtong-Gu, Suwon-Si, Gyeonggi-Do (KR)

(*) Notice: Subject to any disclaimer, the term of this patent is extended or adjusted under 35 U.S.C. 154(b) by 597 days.

(21) Appl. No.: 10/684,881

(22) Filed: Oct. 14, 2003

(65) Prior Publication Data
US 2004/0090980 A1    May 13, 2004

(30) Foreign Application Priority Data
Oct. 14, 2002    (KR) .................. 10-2002-0062599

(51) Int. Cl.
*H04J 14/00*    (2006.01)
(52) U.S. Cl. .................. 398/71; 398/63; 398/70
(58) Field of Classification Search ............ 398/45–59, 398/68–79, 89, 98–100
See application file for complete search history.

(56) References Cited

U.S. PATENT DOCUMENTS

| | | | | |
|---|---|---|---|---|
| 5,648,958 | A * | 7/1997 | Counterman | 370/458 |
| 6,098,103 | A * | 8/2000 | Dreyer et al. | 709/234 |
| 6,167,029 | A | 12/2000 | Ramakrishnan | 370/235 |
| 2002/0027596 | A1* | 3/2002 | Roy | 348/14.01 |
| 2003/0177216 | A1* | 9/2003 | Sutherland et al. | 709/223 |
| 2005/0163149 | A1* | 7/2005 | Unitt et al. | 370/442 |
| 2005/0249497 | A1* | 11/2005 | Haran et al. | 398/58 |

OTHER PUBLICATIONS

Kramer, G.; "Refinement of P2MP Layering Model;" Sep. 2002; http://www.ieee802.org/3/efm/public/sep02/p2mp/kramer_p2mp_1_0902.pdf.

* cited by examiner

*Primary Examiner*—Dzung Tran
(74) *Attorney, Agent, or Firm*—Cha & Reiter, LLC

(57) ABSTRACT

A MAC (Medium Access Control) control block for controlling transmission of data between a plurality of MAC clients and a plurality of MACs in an Ethernet passive optical network (EPON) is provided. The MAC control block includes the plurality of MAC clients and the plurality of MACs associated with the MAC clients for forming a frame for data transmission; a plurality of optical multipoint (OMP) blocks connected between the MAC clients and the MACs for implementing a multipoint control protocol (MPCP); and a multipoint gating control block for controlling the OMP blocks so that when any one of the OMP blocks is transmitting the data, the other OMP blocks are prevented from transmitting data.

7 Claims, 6 Drawing Sheets

MULTIPOINT GATING CONTROL BLOCK IN AN ETHERNET PASSIVE OPTICAL NETWORK AND METHOD THEREFOR

CLAIM OF PRIORITY

This application claims priority under 35 U.S.C. § 119 to an application entitled "Multipoint Gating Control Block in an Ethernet Passive Optical Network and Method Therefor," filed in the Korean Intellectual Property Office on Oct. 14, 2002 and assigned Serial No. 2002-62599, the contents of which are incorporated herein by reference.

BACKGROUND OF THE INVENTION

1. Field of the Invention

The present invention relates generally to an Ethernet passive optical network (EPON), and in particular, to an effective multipoint gating control method between an optical line termination (OLT) and a plurality of optical network units (ONUs) of an EPON.

2. Description of the Related Art

Standardization of medium access control (MAC) technology for Gigabit Ethernet and asynchronous transfer mode-passive optical network (ATM-PON) has been completed recently, and the contents thereof are disclosed in IEEE 802.3z and ITU-T G983.1. In an ATM-PON, upstream and downstream transmissions are performed using a frame, which consist of a group of ATM cells having a predetermined size. In a tree-type PON, an OLT selectively inserts downstream cells to a frame to be distributed to the respective ONUs.

FIG. 1 is a block diagram illustrating a physical network structure of a general passive optical network. FIG. 1 shows an example in which three ONUs 110-1 to 110-3 are connected to one OLT 100. At least one end user (or network device) 120-1 to 120-3 is connected to each of the ONUs 110-1 to 110-3. Data 131-1 to 133-1 transmitted by the end users 120-1 to 120-3 is delivered to the OLT 100 via the ONUs 110-1 to 110-3.

In operation, ONU's data is accessed by time division multiplexing (TDM) for upstream transmission. An optical distribution network (ODN), which is a passive element, prevents data collision through a so-called ranging method. In other words, during upstream transmission, data from the ONUs 110-1 to 110-3 is multiplexed before being transmitted to the OLT 100. During downstream transmission, the ONUs 110-1 to 110-3 receiving data broadcasted by the OLT 100 select only its own data from the received data. To this end, upstream and downstream frames include a field capable of exchanging messages at the specified periods, which assigned in a private ATM cell or a general ATM cell. With the development of Internet technology, a subscriber side now requires more bandwidth, so an end-to-end transmission is typically achieved with Gigabit Ethernet technology, which provides relatively cheaper equipments and higher bandwidth over the ATM technology, which requires segmentation of IP packet and has a limited bandwidth. Therefore, Ethernet technology is ideal for the PON structure instead of ATM technology. Standardization of such an EPON is now under way in IEEE 802.3ah in the name of EFM (Ethernet in the First Mile).

Such an EPON, unlike the conventional Ethernet-based network, is characterized by having a point-to-multipoint structure instead of a point-to-point (PTP) structure. Therefore, Draft v1.0 of IEEE 802.3ah has introduced a virtual MAC (VMAC) structure so that an OLT which is a master can efficiently manage respective ONUs.

FIG. 2 is a diagram illustrating a v MAC structure for an OLT in the EPON standard. As shown in FIG. 2, unlike the existing MAC, the illustrated MAC is divided into several virtual MACs, and the virtual MACs are mapped to respective ONUs. That is, upon receiving a frame, a reconcile sublayer (RS) analyzes a logical link identifier (LLID), splits the received frame to a vMAC associated with the LLID, and delivers the split frame to an upper layer. In actual implementation, vMACs can be optionally implemented with one MAC.

In this case, an optical multipoint (OMP) function block for implementing a multipoint control protocol (MPCP) of an EPON as well as a function of managing and controlling a plurality of MACs is achieved in the MAC control layer. Therefore, this is called "multipoint MAC control" in IEEE 802.3ah. The OMP function block includes a Flow control function performed in the existing MAC control, and such MPCH functions as Gate processing, Report processing, and Discovery processing functions.

Meanwhile, in EPON standardization which is now under way in IEEE 802.3ah, a control block is required which informs the respective logical or physical MACs for the transmission of the frames in order for several MAC clients to send frames to one PHY, or physical port, via their logical of physical MACs. If several logical or physical MACs simultaneously transmit frames, collision may occur in the PHY, or physical port, shared by the MACs.

In order to prevent such collision between MACs, the ongoing IEEE 802.3ah EPON standardization has proposed Muxing Control for controlling the collision. Its fundamental operational principle is to provide a transmission enable signal (transmitEnable) to respective logical or physical MACs, to control when and how long the MACs can transmit fames.

FIG. 3 is a diagram illustrating a case in which several MAC clients transmit frames to one physical port. As shown in FIG. 3, a multiplexing control block 230 can control (or inform) several logical or physical MACs when and how long they can transmit frames. However, while a logical or physical MAC 204 is transmitting a frame in response to its transmission enable signal (transmitEnable) being turned On, if the transmission enable signal transmitEnable to the MAC 204 is turned Off and a transmission enable signal (transmitEnable) to a logical or physical MAC 214 is turned On, collision occurs between the frame being transmitted by the MAC 204 and a frame newly transmitted by the MAC 214. In order to prevent the collision, frame transmission by the MAC 204 must be immediately suspended. As a result, in the conventional standard technology, frame collision or frame loss may occur during the frame transmission.

In this structure, since MAC clients as well as MACs are separated, there is a demand for a mechanism capable of transmitting only one frame at a time during frame transmission from a MAC client to a MAC. However, the current Draft provides no definition on it.

SUMMARY OF THE INVENTION

The present invention is directed to a control mechanism capable of resolving a synchronization problem so as to transmit only one frame at a time during the frame transmission from multiple MAC clients in a multi-MAC structure, which manages a plurality of MAC entities according to a vMAC structure.

One aspect of the present invention is to provide a multipoint gating control block for preventing frame collision or frame loss during frame transmission by adding a transmission_in_progress state variable, and a method therefor.

Another aspect of the present invention is to provide a MAC (Medium Access Control) control block for controlling transmission of data between a plurality of MAC clients and a plurality of MACs in an Ethernet passive optical network (EPON). The MAC control block includes the plurality of MAC clients and the plurality of MACs associated with the MAC clients for forming a frame for data transmission; a plurality of optical multipoint (OMP) blocks connected between the MAC clients and the MACs for implementing a multipoint control protocol (MPCP); and a multipoint gating control block for controlling the OMP blocks so that when any one of the OMP blocks is transmitting the data, other OMP blocks are prevented from transmitting data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. For the purposes of clarity and simplicity, a detailed description of well known functions and configurations incorporated herein has been omitted.

Figure 1:
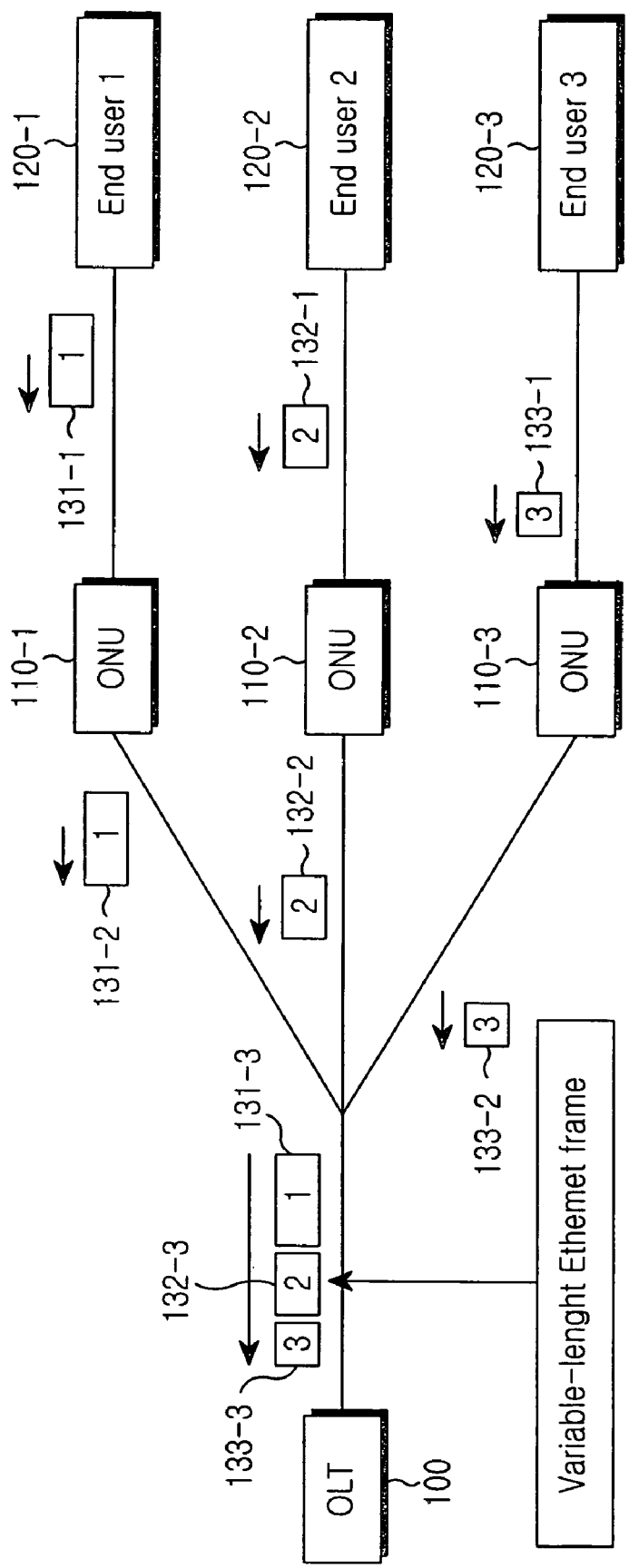
FIG. 1 is a block diagram illustrating a physical network structure of a general passive optical network.
Figure 2:
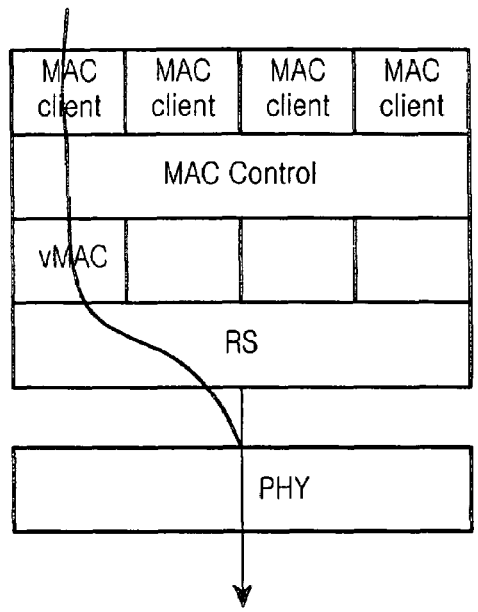
FIG. 2 is a diagram illustrating a vMAC structure for an OLT in accordance with the EPON standard.
Figure 3:
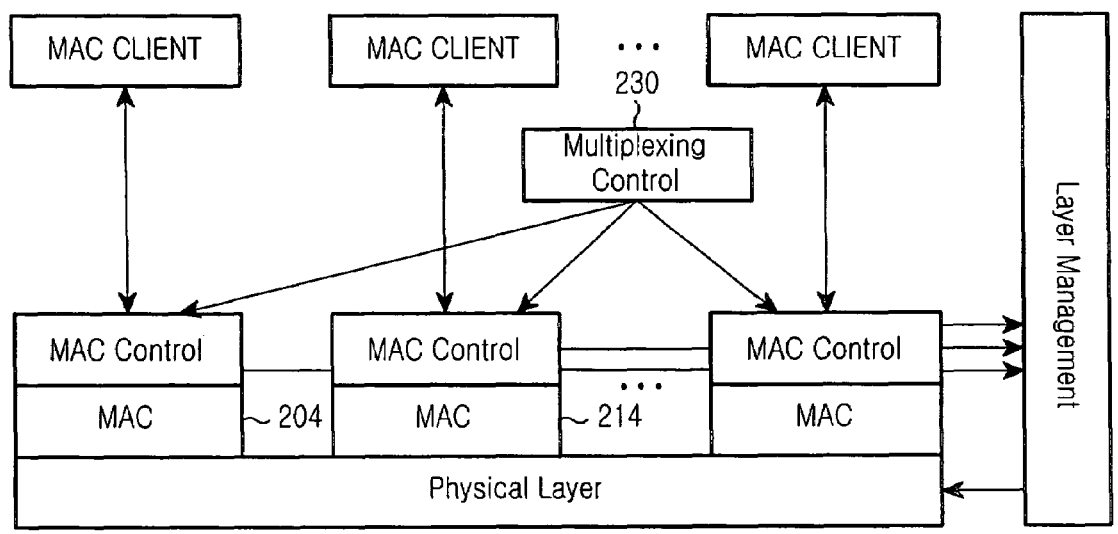
FIG. 3 is a diagram illustrating a case in which several MAC clients transmit frames to one physical port.
Figure 4:
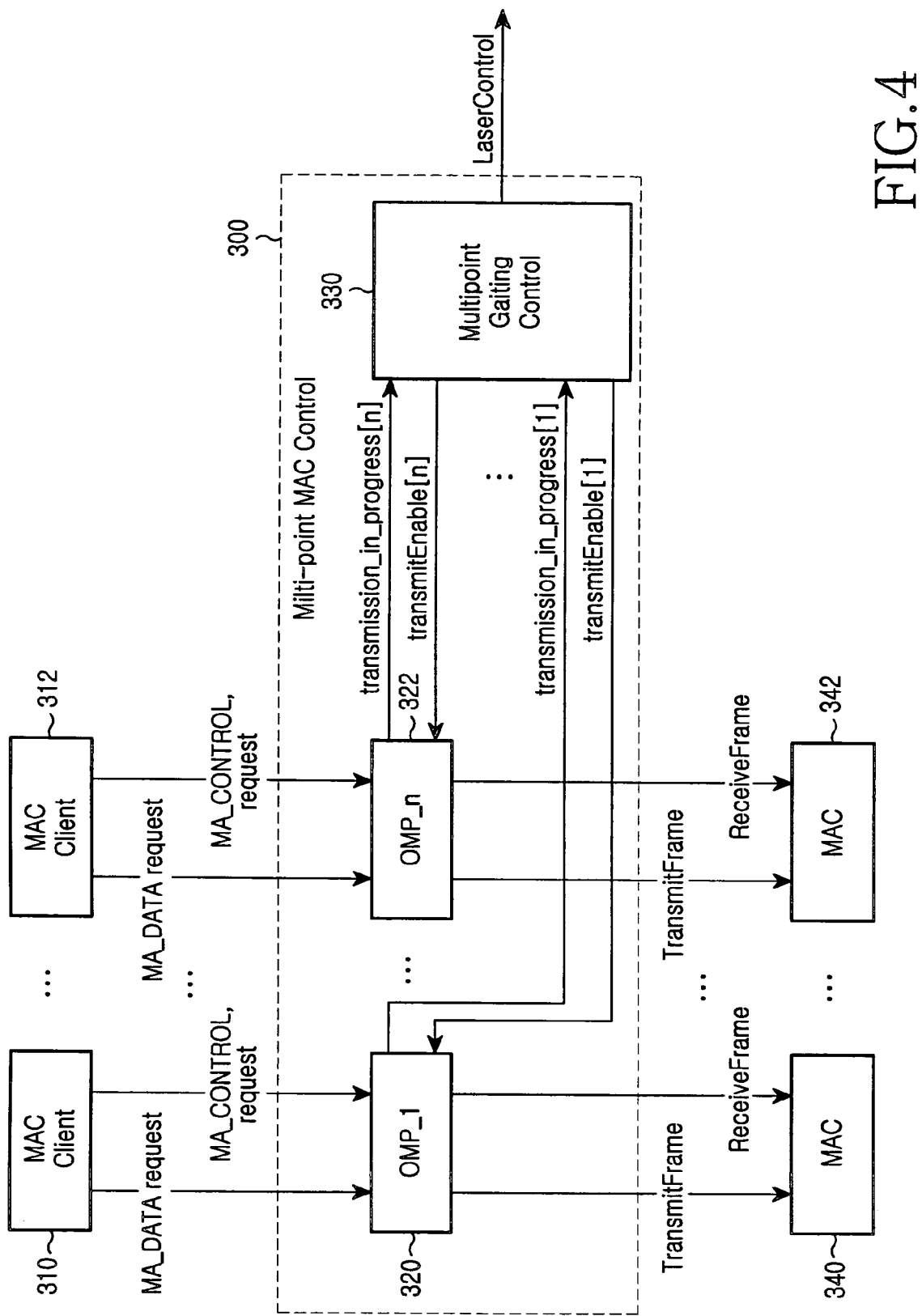
FIG. 4 is a block diagram illustrating a multipoint gating control block and an OMP block according to an embodiment of the present invention.

FIG. 4 is a block diagram illustrating a multipoint gating control block and an OMP block according to an embodiment of the present invention. As shown in FIG. 4, a plurality of MACs and MAC clients are interfaced with each other by an existing 802.3 service indicated by: MA_data.request, MA_data.indication, MA_control.request, and MA_control.indication. The MACs and MAC clients are connected to OMP blocks 320 and 322 in a multipoint MAC control layer 300. The multipoint gating control function block proposes a scheme for controlling respective OMP blocks by setting a transmitEnable[i] state variable and a transmission_in_progress[i] state variable. In the state variables, an index indicted by 'i' represents a connection to each vMAC.

In operation, a multipoint gating control block 330 provides transmitEnable[i] state variables to the OMP blocks 320 and 322 connected to the MAC clients, to control the frame transmission by the MAC clients. Upon receiving a transmission_in_progress[i] state variable from any one of the OMP blocks 320 and 322 connected to the MAC clients, the multipoint gating control block 330 prevents other MAC clients from transmitting frames, determining that one of the MAC clients is transmitting a frame.

Herein, in the transmitEnable[i] state variable, a return value is expressed as a Boolean value. If the return value is True, it represents that a transmit path is opened to enable data transmission from the MAC client to its associated MAC. However, if the return value is False, it represents that a transmit path is closed to prevent data transmission from the MAC client to its associated MAC. In addition, a value of the state variable is set in such a manner that only one of the whole state variables is set to True so that a transmit path is opened to only one MAC at a time.

Similarly, the transmission_in_progress[i] state variable indicates whether the current MAC is transmitting a frame. Also, in the transmission_in_progress[i] state variable, a return value is expressed as a Boolean value. If the return value is True, it represents that there is a currently-transmitted frame. However, if the return value is False, it represents that there is no currently-transmitted frame.

In FIG. 4, a LaserControl state variable is a stable variable controlling a MAC and a physical layer. In order to control the laser in an EPON operating in a burst mode, the LaserControl state variable is present to the laser to turn On/Off the laser during the transmission of a frame. In an OLT, its default value has an On value.

Figure 5:
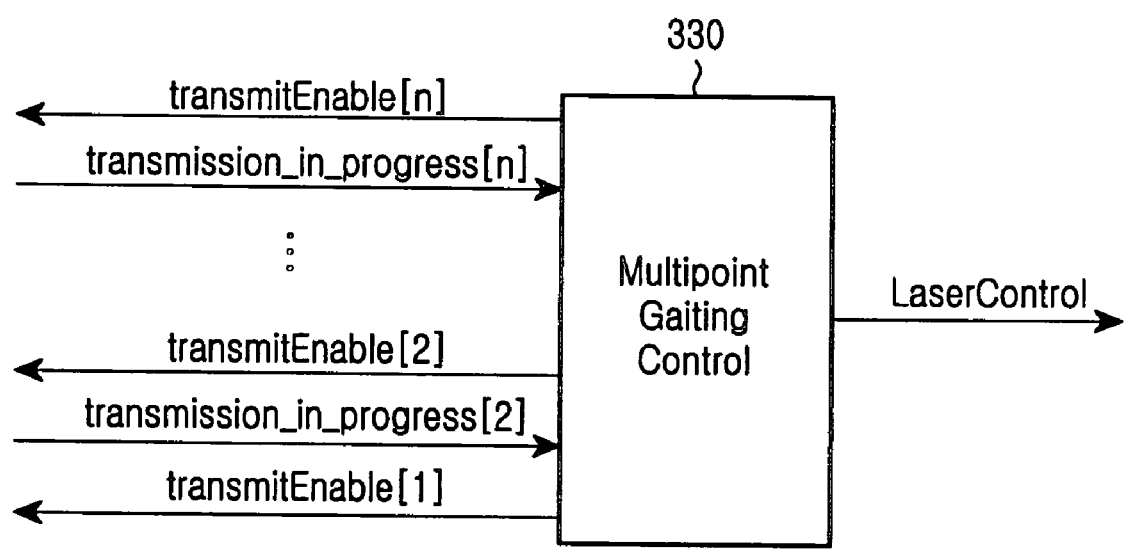
FIG. 5 is an enlarged diagram illustrating the multipoint gating control block illustrated in FIG. 4.

FIG. 5 is an enlarged diagram illustrating the multipoint gating control block depicted in FIG. 4. The multipoint gating control function block 330 controls the OMP blocks by setting transmitEnable[i] state variables and transmission_in_progress[i] state variables. Here, the 'i', as stated above, identifies a vMAC. For example, the multipoint gating control function block 330 instructs data transmission from a MAC client to a particular vMAC(2) using a transmitEnable[i] state variable, and thereafter, receives from the vMAC(2) a transmission_in_progress[i] state variable indicating whether the current MAC is transmitting a frame. Based on the transmission_in_progress[i] state variable from the vMAC(2), the multipoint gating control function block 330 provides a vMAC(1) with a transmitEnable[i] state variable indicating whether a MAC client will transmit data, to thereby inform whether a MAC client associated with the vMAC(1) will transmit a frame.

Figure 6:
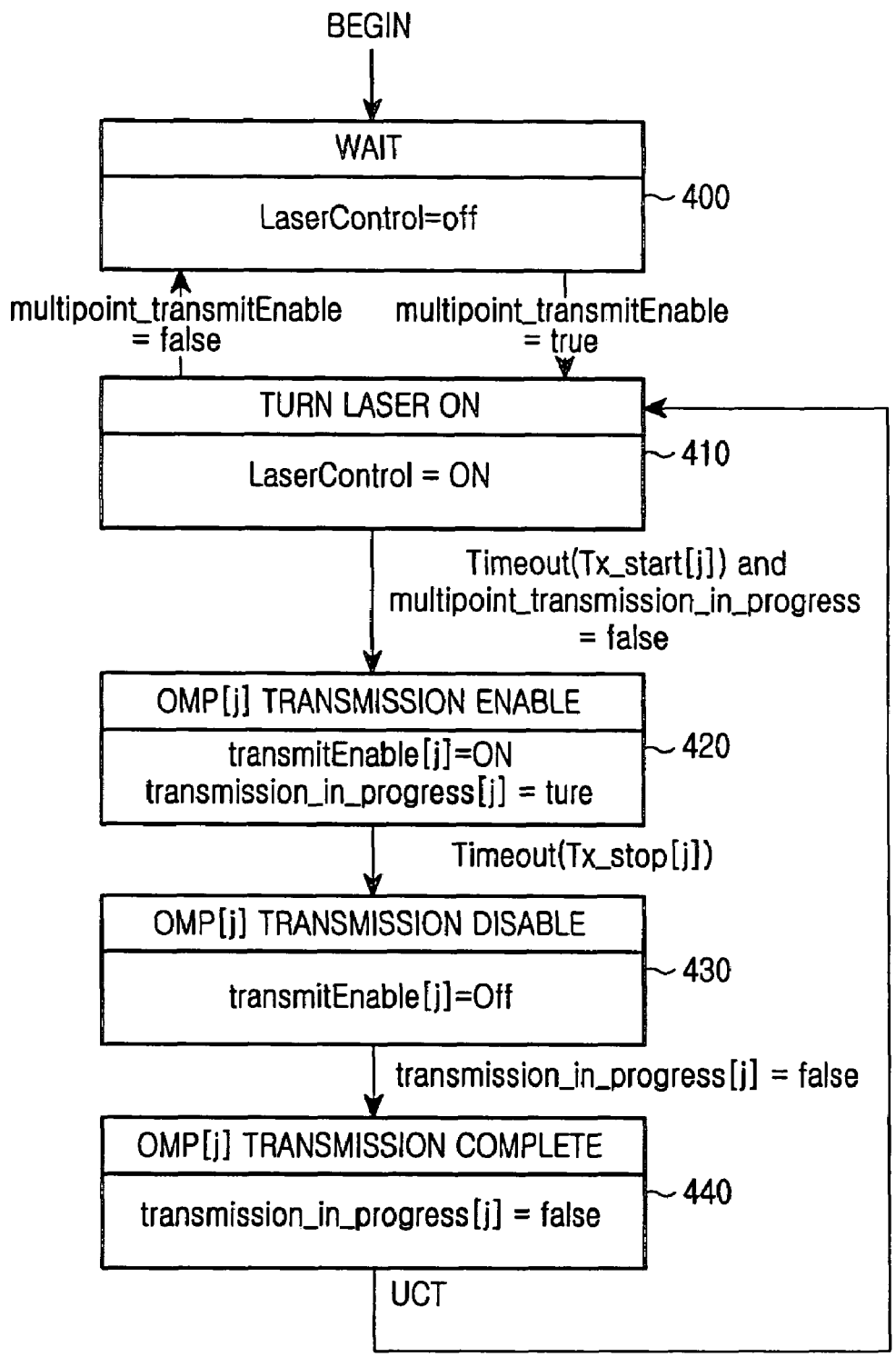
FIG. 6 illustrates a state diagram of a multipoint gating control block according to an embodiment of the present invention.

FIG. 6 illustrates a state diagram of a multipoint gating control block according to an embodiment of the present invention. To assist in the understanding of the present invention, a definition of variables used herein will be given below prior to the discussion of FIG. 6.

A multipoint_transmitEnable state variable has a True value if any one of MAC clients requests data transmission, but has a False value if there is no data transmission request from the MAC clients. Similarly, a multipoint_transmission_in_progress state variable has a True value if any one of transmission_in_progress[i] state variables has a True value but a False value if there is no transmission_in_progress[i] state variable having a True value.

A Tx_start[i] state variable and a Tx_stop[i] state variable are values indicating input values of their timers, wherein Timeout(Tx_start[i]) indicates a time when an OMP[i] starts the transmission while Timeout(Tx_stop[i]) indicates a time when an OMP[i] stops the transmission.

Referring to back FIG. 6, if an ONU is powered up or reset, a transition occurs from a BEGIN state to a WAIT state in step 400. In the WAIT state, LaserControl is in an Off state. If one or multiple transmitEnable signals become True, LaserControl becomes a TURN LASER ON state in step 410. That is, if multipoint_transmitEnable=True where a transmission opportunity is given to any one of OMPs in the WAIT state, a transition occurs to a TURN LASER ON state.

In the TURN LASER ON state of step 410, LaserControl is set to an ON state, it is determined that transmission_in-_progress signals from all current logical or physical MACs are False. Thereafter, if Timeout(Tx_start[j]) indicating a transmission start time of an OMP[j] is generated, a transition occurs to an OMP[j] TRANSMISSION ENABLE state in step 420.

In the OMP[j] TRANSMISSION ENABLE state of step 420, it is determined that transmitEnable[j]=ON, and transmission_in_progress[j] is set to True during frame transmission. In this state, OMP[j] cannot transmit a frame. If currently there is no transmission frame and it is a transmission start time when an OMP[j] starts transmission, a transition occurs to an ENABLE state where transmitEnable[i]=True. This signal, as described in conjunction with FIG. 4, is delivered to a corresponding OMP block, and this indicates that a corresponding MAC client has acquired a change to transmit a frame. In this state, if transmission_in_progress=False is delivered to an OMP block, it returns to the beginning.

If Timeout(Tx_stop[j]) indicating a transmission stop time of an OMP[j] is generated, a transition occurs to an OMP[j] TRANSMISSOIN DISABLE state in step 430. In the OMP[j] TRANSMISSOIN DISABLE state of step 430, it is determined that transmitEnable[j]=Off. If transmission frames still exist, it indicates that transmission_in_progress[j] is still in a True state, so transmission_in_progress[j] is set to False after frame transmission is completed. Thereafter, a transition occurs to an OMP[j] TRANSMISSON COMPLETE state in step 440. This is to make a state transition after completing the transmission of a current frame even though timeout occurs. In this state diagram, a specific value of a timer is delivered from an upper layer.

Figure 7:
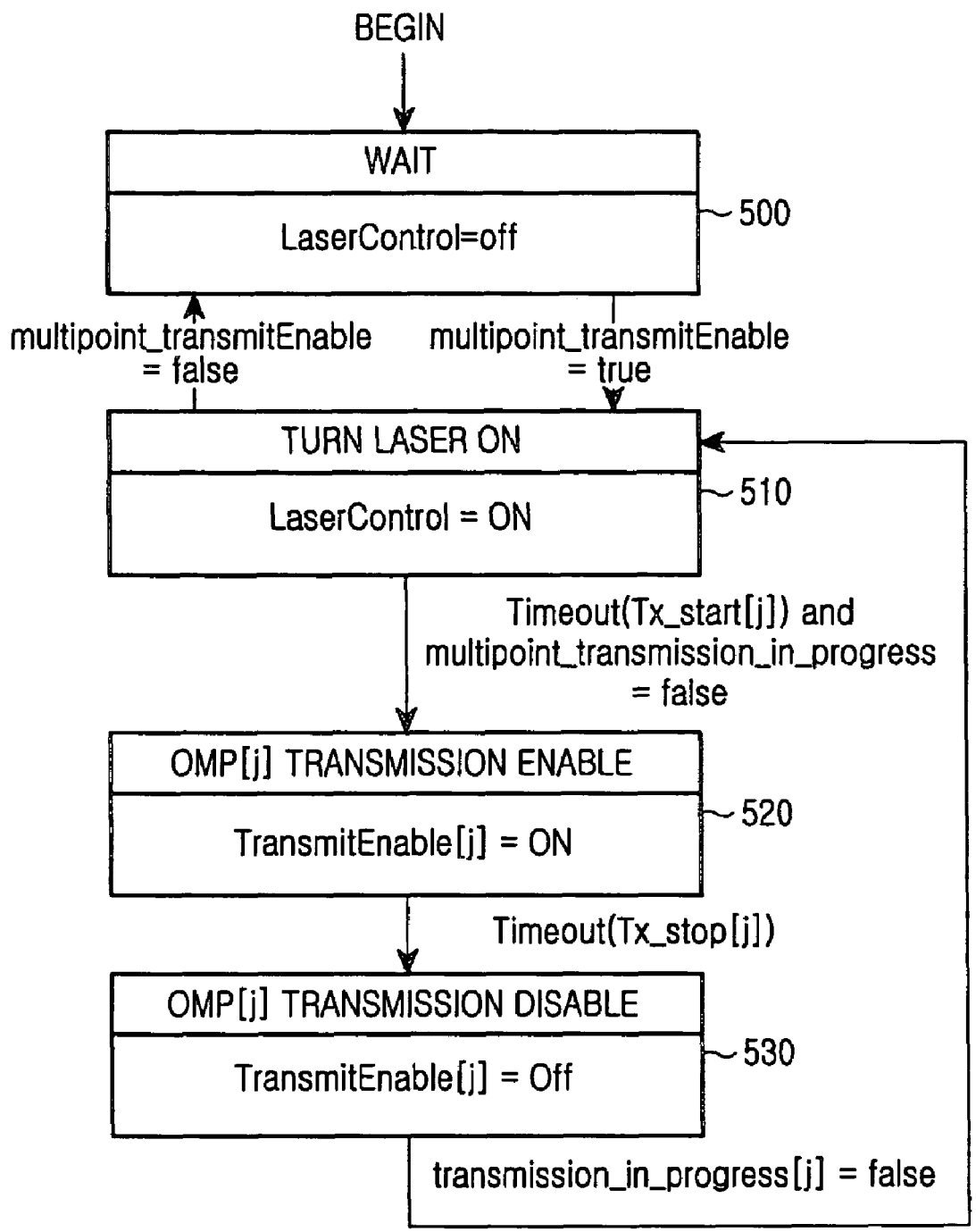
FIG. 7 is a state diagram of a multipoint gating control block according to another embodiment of the present invention.

FIG. 7 is a state diagram of a multipoint gating control block according to another embodiment of the present invention. In FIG. 7, state transition happens from the OMP[j] TRANSMISSION DISABLE state of step 430 in FIG. 6 directly to the a TURN LASER ON state of step 510 without passing the OMP[j] TRANSMISSION COMPLETE state. In the TURN LASER ON state of step 510, if all transmitEnable signals are in an Off state, a transition occurs to a WAIT state of step 500 where LaserControl is set to Off.

As can be understood from the foregoing description, the invention provides a control mechanism capable of resolving a synchronization problem so as to transmit only one frame at a time during frame transmission from multiple MAC clients in a multi-MAC structure which manages a plurality of MAC entities according to a vMAC structure. In addition, the invention can prevent frame collision or frame loss during frame transmission by adding a transmission_in_progress state variable to the existing scheme.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A MAC (Medium Access Control) control block for controlling transmission of data between a plurality of MAC clients and a plurality of MACs in an Ethernet passive optical network (EPON), comprising:
   a plurality of optical multipoint (OMP) blocks connected between the MAC clients and the MACs for implementing a multipoint control protocol (MPCP); and
   a multipoint gating control block configured to receive transmission_in_progress state variables from the OMP blocks connected to their associated MAC clients, to determine transmission states of the MAC clients with the received transmission_in_progress state variables, and to selectively control the OMP blocks so that when any one of the OMP blocks is transmitting the data, the other OMP blocks are prevented from transmitting data,
   wherein each of the transmission_in_progress state variables indicates whether a corresponding MAC client is transmitting data or not, and
   wherein each of the transmission in progress state variables is expressed as a Boolean value indicating whether a corresponding MAC client is transmitting data or not.

2. The MAC control block of claim 1, wherein the multipoint gating control block is configured to control data transmission by the MAC clients by providing transmission enable state variables to the OMP blocks connected to their associated MAC clients.

3. The MAC control block of claim 1, wherein the multipoint gating control block determines a value of a transmission enable state variable by driving a timer indicating a transmission start time and a transmission stop time and provides a transmission opportunity by delivering the value to a corresponding OMP block.

4. The MAC control block of claim 1, wherein the plurality of MACs is a plurality of virtual MACs.

5. A multipoint gating control method in a MAC (Medium Access Control) control block for controlling transmission of data between a plurality of MAC clients and a plurality of MACs in an Ethernet passive optical network (EPON), the method comprising the steps of:
   receiving transmission_in_progress state variables from the OMP blocks connected to their associated MAC clients;
   determining transmission states of the MAC clients; and
   controlling data transmission by the MAC clients by providing transmission enable state variables to the OMP blocks connected to their associated MAC clients,
   wherein each of the transmission_in_progress state variables indicates whether a corresponding MAC client is transmitting data or not, and
   wherein each of the transmission_in_progress state variables is expressed as a Boolean value indicating whether a corresponding MAC client is transmitting data or not.

6. The multipoint gating control method of claim 5, further comprising the step of determining a value of a transmission enable state variable by driving a timer indicating a transmission start time and a transmission stop time, and providing a transmission opportunity by delivering the value to a corresponding OMP block.

7. The multipoint gating control method of claim 5, wherein the plurality of MACs is a plurality of virtual MACs.

* * * * *